United States Patent
Blanchard et al.

(10) Patent No.: US 10,628,754 B2
(45) Date of Patent: Apr. 21, 2020

(54) PERSONAL ASSISTANT FOR FACILITATING INTERACTION ROUTINES

(71) Applicant: AT&T Intellectual Property I, L.P., Atlanta, GA (US)

(72) Inventors: Harry Blanchard, Rumson, NJ (US); Lan Zhang, Malvern, PA (US); Gregory Pulz, Cranbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 126 days.

(21) Appl. No.: 15/614,723

(22) Filed: Jun. 6, 2017

(65) Prior Publication Data

US 2018/0349799 A1     Dec. 6, 2018

(51) Int. Cl.
*G06N 99/00*      (2019.01)
*G10L 15/06*      (2013.01)
(Continued)

(52) U.S. Cl.
CPC ............ *G06N 20/00* (2019.01); *G10L 15/063* (2013.01); *G10L 15/22* (2013.01); *G10L 15/1822* (2013.01)

(58) Field of Classification Search
CPC .... G06N 99/005; G06N 20/00; G10L 15/063; G10L 17/24
See application file for complete search history.

(56) References Cited

U.S. PATENT DOCUMENTS 5,953,718 A    9/1999 Wical
5,995,921 A    11/1999 Richards et al.
(Continued)

FOREIGN PATENT DOCUMENTS

WO   WO 2007052285 A2   8/2009
WO   WO 2013043672 A1   3/2013
WO   WO 2014145149 A1   9/2014

OTHER PUBLICATIONS

Jeon, Jiwoon, W. Bruce Croft, and Joon Ho Lee. "Finding similar questions in large question and answer archives." Proceedings of the 14th ACM international conference on Information and knowledge management. ACM, 2005. http://scholarworks.umass.edu/cgi/viewcontent.cgi?article=1137&context=cs_faculty_pubs (the text below Figure 1 in the rightmost column of the 4th Page).

(Continued)

*Primary Examiner* — Daniel C Washburn
*Assistant Examiner* — Oluwadamilola M Ogunbiyi

(57) ABSTRACT

In one example, the present disclosure describes a device, computer-readable medium, and method for automatically learning and facilitating interaction routines involving at least one human participant. In one example, a method includes learning an interaction routine conducted between a human user and a second party, wherein the interaction routine comprises a series of prompts and responses designed to identify and deliver desired information, storing a template of the interaction routine based on the learning, wherein the template includes at least a portion of the series of prompts and responses, detecting, in the course of a new instance of the interaction routine, at least one prompt from the second party that requests a response from the human user, and using the template to provide a response to the prompt so that involvement of the human user in the new instance of the interaction routine is minimized.

20 Claims, 4 Drawing Sheets

(51) Int. Cl.
*G10L 17/24* (2013.01)
*G06F 3/16* (2006.01)
*G06N 20/00* (2019.01)
*G10L 15/22* (2006.01)
*G10L 15/18* (2013.01)

(56) References Cited

U.S. PATENT DOCUMENTS

| | | | |
|---|---|---|---|
| 6,526,404 B1 | 2/2003 | Slater et al. | |
| 7,287,021 B2 | 10/2007 | De | |
| 7,918,666 B1 | 4/2011 | Lewolt | |
| 8,024,308 B2 | 9/2011 | Jones et al. | |
| 8,060,524 B2 | 11/2011 | Schechter et al. | |
| 8,117,196 B2 | 2/2012 | Jones et al. | |
| 8,200,610 B1 | 6/2012 | Birch et al. | |
| 8,280,921 B2 | 10/2012 | Jones et al. | |
| 8,566,102 B1* | 10/2013 | Bangalore | G10L 15/22 704/270.1 |
| 8,898,241 B2 | 11/2014 | Jones et al. | |
| 8,990,126 B1* | 3/2015 | Bangalore | G06F 17/211 706/12 |
| 9,082,084 B2 | 7/2015 | Ogilvie et al. | |
| 9,098,808 B1 | 8/2015 | Ventilla et al. | |
| 9,386,152 B2 | 7/2016 | Riahi et al. | |
| 9,424,341 B2 | 8/2016 | Kleinberger | |
| 9,444,772 B2 | 9/2016 | Ventilla et al. | |
| 2001/0034015 A1 | 10/2001 | Raichur et al. | |
| 2003/0229471 A1* | 12/2003 | Guralnik | G06K 9/00496 702/182 |
| 2004/0083092 A1 | 4/2004 | Valles | |
| 2005/0105712 A1* | 5/2005 | Williams | G10L 13/027 379/265.02 |
| 2006/0069546 A1* | 3/2006 | Rosser | G10L 15/22 704/9 |
| 2006/0287850 A1* | 12/2006 | Morikawa | G10L 15/22 704/200 |
| 2008/0114710 A1* | 5/2008 | Pucher | G06N 20/00 706/20 |
| 2010/0049526 A1* | 2/2010 | Lewis | G10L 15/22 704/273 |
| 2010/0131265 A1 | 5/2010 | Liu et al. | |
| 2010/0138402 A1 | 6/2010 | Burroughs et al. | |
| 2011/0289068 A1 | 11/2011 | Teevan et al. | |
| 2012/0310652 A1 | 12/2012 | O'sullivan | |
| 2013/0211880 A1* | 8/2013 | Kannan | G06Q 10/06398 705/7.32 |
| 2013/0212190 A1* | 8/2013 | Patil | G06F 17/276 709/206 |
| 2015/0288818 A1 | 10/2015 | Srivastava et al. | |
| 2015/0332152 A1* | 11/2015 | Goldschmidt | G06F 17/28 704/9 |
| 2016/0203415 A1* | 7/2016 | Chaiyochlarb | G06N 99/005 706/11 |
| 2016/0306800 A1 | 10/2016 | Son et al. | |
| 2016/0358065 A1* | 12/2016 | Gedge | G06N 3/006 |
| 2017/0039297 A1* | 2/2017 | Koutrika | G06F 17/21 |
| 2017/0118336 A1* | 4/2017 | Tapuhi | H04M 3/5166 |
| 2017/0337364 A1* | 11/2017 | Whaley | G06N 20/00 |
| 2018/0077088 A1* | 3/2018 | Cabrera-Cordon | H04L 51/02 |
| 2018/0165691 A1* | 6/2018 | Heater | G06Q 30/016 |
| 2018/0174055 A1* | 6/2018 | Tirumale | G06N 5/02 |
| 2018/0189282 A1* | 7/2018 | Hartlaub | G06F 17/30035 |
| 2018/0212790 A1* | 7/2018 | Jacobson | H04L 12/1831 |
| 2018/0218627 A1* | 8/2018 | Smith Lewis | G09B 7/04 |
| 2018/0233152 A1* | 8/2018 | Olaya | G10L 15/22 |
| 2018/0240028 A1* | 8/2018 | Baracaldo Angel | H04L 63/1408 |
| 2018/0293367 A1* | 10/2018 | Urman | H04L 67/12 |
| 2018/0314689 A1* | 11/2018 | Wang | G10L 15/1822 |
| 2018/0337936 A1* | 11/2018 | Mehrotra | H04L 63/1425 |
| 2019/0286996 A1* | 9/2019 | Tian | G06N 5/02 |
| 2019/0347321 A1* | 11/2019 | Chen | G06F 3/167 |

OTHER PUBLICATIONS

Xue, Xiaobing, Jiwoon Jeon, and W. Bruce Croft. "Retrieval models for question and answer archives." Proceedings of the 31st annual international ACM SIGIR conference on Research and development in information retrieval. ACM, 2008. http://maroo.cs.umass.edu/pdf/IR652.pdf (Tables 2 and 3 in the 5th Page).

Wang, Kai, Zhaoyan Ming, and Tat-Seng Chua. "A syntactic tree matching approach to finding similar questions in community-based qa services" Proceedings of the 32nd international ACM SIGIR conference on Research and development in information retrieval. ACM, 2009. http://lms.comp.nus.edu.sq/sites/default/files/publicationattachments/sigir09wang.pdf (Figure 2 and Section 4 on the 4th Page).

Duan, Huizhong, et al. "Searching Questions by Identifying Question Topic and Question Focus." ACL. 2008. https://www.aclweb.org/anthology/P/P08/P081.pdf#page=200. (Figure 2.2 in Section 2 on pp. 158159).

Jijkoun, Valentin, and Maarten de Rijke. "Retrieving answers from frequently asked questions pages on the web." Proceedings of the 14th ACM international conference on Information and knowledge management. ACM, 2005. http://www.science.uva.nl/~mdr/Publications/Files/cikm2005faqs.pdf. (Sections 4 and 5 from the 3rd Pages).

* cited by examiner

PERSONAL ASSISTANT FOR FACILITATING INTERACTION ROUTINES

The present disclosure relates generally to machine learning, and relates more particularly to devices, non-transitory computer-readable media, and methods for automatically learning and facilitating interaction routines involving at least one human participant.

BACKGROUND

Certain interactions are characterized by fairly predictable, expected routines. For instance, performing a banking transaction, checking the status of an airline flight, and making a retail purchase all involve exchanges of certain expected types of information. As an example, if a person wishes to check on the status of an airline flight, he or she may be asked to supply the name of the airline, the flight number, the origin or destination airport, or other information that would help a customer service representative or an automated system identify the airline flight for which the status is sought. The customer service representative or automated system may respond with a status identifier for the airline flight in question, such as "On time" or "Delayed."

SUMMARY

In one example, the present disclosure describes a device, computer-readable medium, and method for automatically learning and facilitating interaction routines involving at least one human participant. In one example, a method includes learning an interaction routine conducted between a human user and a second party, wherein the interaction routine comprises a series of prompts and responses designed to identify and deliver desired information, storing a template of the interaction routine based on the learning, wherein the template includes at least a portion of the series of prompts and responses, detecting, in the course of a new instance of the interaction routine, at least one prompt from the second party that requests a response from the human user, and using the template to provide a response to the prompt so that involvement of the human user in the new instance of the interaction routine is minimized.

In another example, a device includes a processor and a computer-readable medium storing instructions which, when executed by the processor, cause the processor to perform operations. The operations include learning an interaction routine conducted between a human user and a second party, wherein the interaction routine comprises a series of prompts and responses designed to identify and deliver desired information, storing a template of the interaction routine based on the learning, wherein the template includes at least a portion of the series of prompts and responses, detecting, in the course of a new instance of the interaction routine, at least one prompt from the second party that requests a response from the human user, and using the template to provide a response to the prompt so that involvement of the human user in the new instance of the interaction routine is minimized.

In another example, a computer-readable medium storing instructions which, when executed by a processor, cause the processor to perform operations. The operations include learning an interaction routine conducted between a human user and a second party, wherein the interaction routine comprises a series of prompts and responses designed to identify and deliver desired information, storing a template of the interaction routine based on the learning, wherein the template includes at least a portion of the series of prompts and responses, detecting, in the course of a new instance of the interaction routine, at least one prompt from the second party that requests a response from the human user, and using the template to provide a response to the prompt so that involvement of the human user in the new instance of the interaction routine is minimized.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure automatically learns and facilitates interaction routines (i.e., repeated or predictable series of steps used to conduct interaction) involving at least one human participant. As discussed above, certain interactions are characterized by fairly predictable, expected routines (e.g., a series of prompts and responses designed to identify and deliver desired information). However, the mechanism through which these routines are performed may vary. For instance, if a person wishes to check on the status of an airline flight, he may call a customer service number that connects him to a human representative, an automated system (e.g., an interactive voice response (IVR) system), or to both a human representative and an automated system. Moreover, different airlines may implement different types of systems for providing flight status information. For instance, a first airline may provide flight status information exclusively via an automated system, while a second airline may provide flight status information via a combination of an automated system and a human representative. Thus, although the act of calling a customer service number to check on the status of a flight may be a fairly routine process, the specifics of the interaction may vary from case to case. As such, if a person is not familiar with a particular system, he may devote a substantial amount of time and effort to completing even a simple transaction using the system.

Examples of the present disclosure employ a combination of machine learning and natural language understanding techniques in order to observe and detect patterns or routines in a human user's interactions with an interactive system. In one example, the interactive system could be an automated system (e.g., an IVR system), another human (e.g., a customer service representative), or a combination of an automated system and another human (e.g., an automated system that collects certain information from the user before directing him to a particular customer service representative). Once an interaction routine is detected, the proper user responses can be learned, stored, and used to facilitate future interactions with minimal user assistance.

Although examples of the disclosure are described within the context of a telephone call, it will be appreciated that the examples could be used to facilitate and conduct any type of interaction routine involving at least one human user. For instance, the disclosure could just as easily be used to facilitate and conduct an interaction routine over a text telephone, a web-based access portal, or a web-based chat feature.

Figure 1:
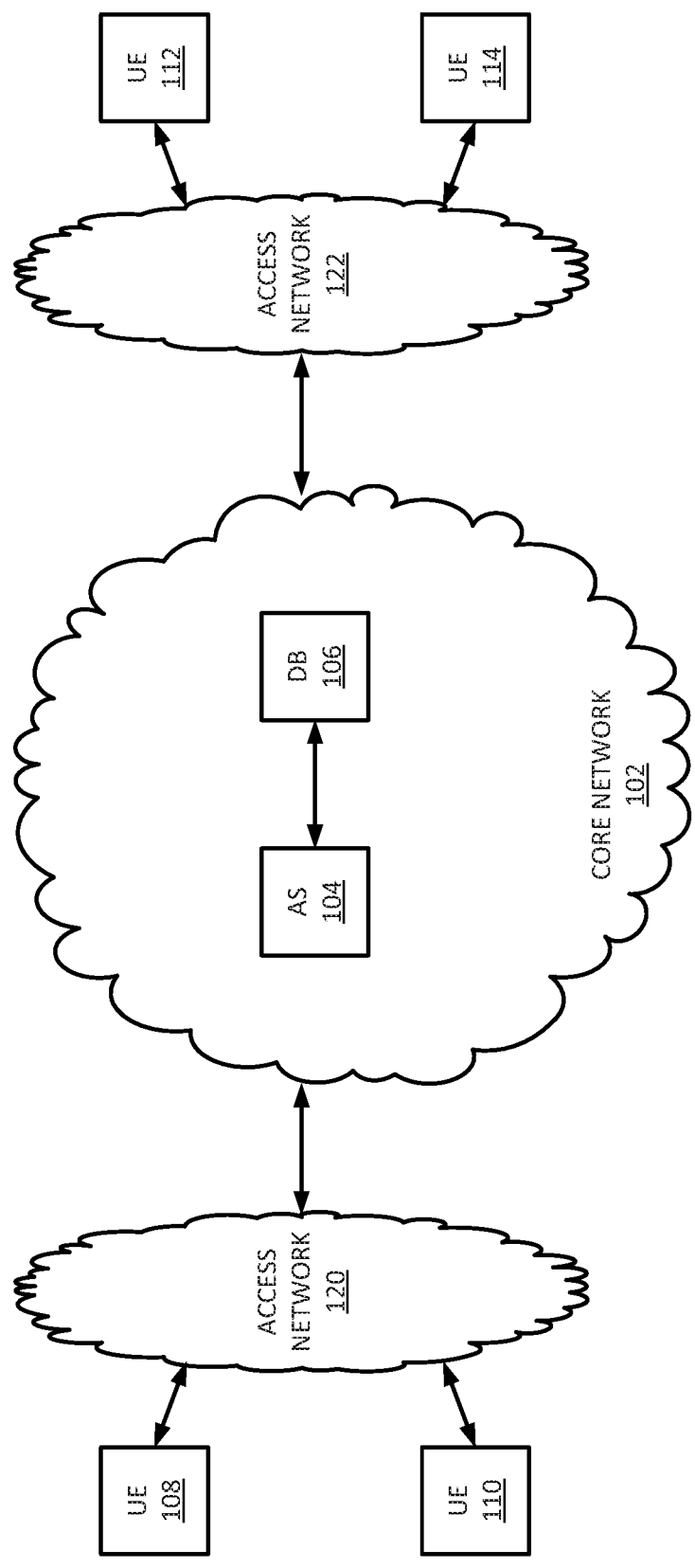
FIG. 1 illustrates an example network related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers 104 or databases 106 may be deployed. Furthermore, for ease of illustration, various additional elements of core network 102 are omitted from FIG. 1.

Figure 4:
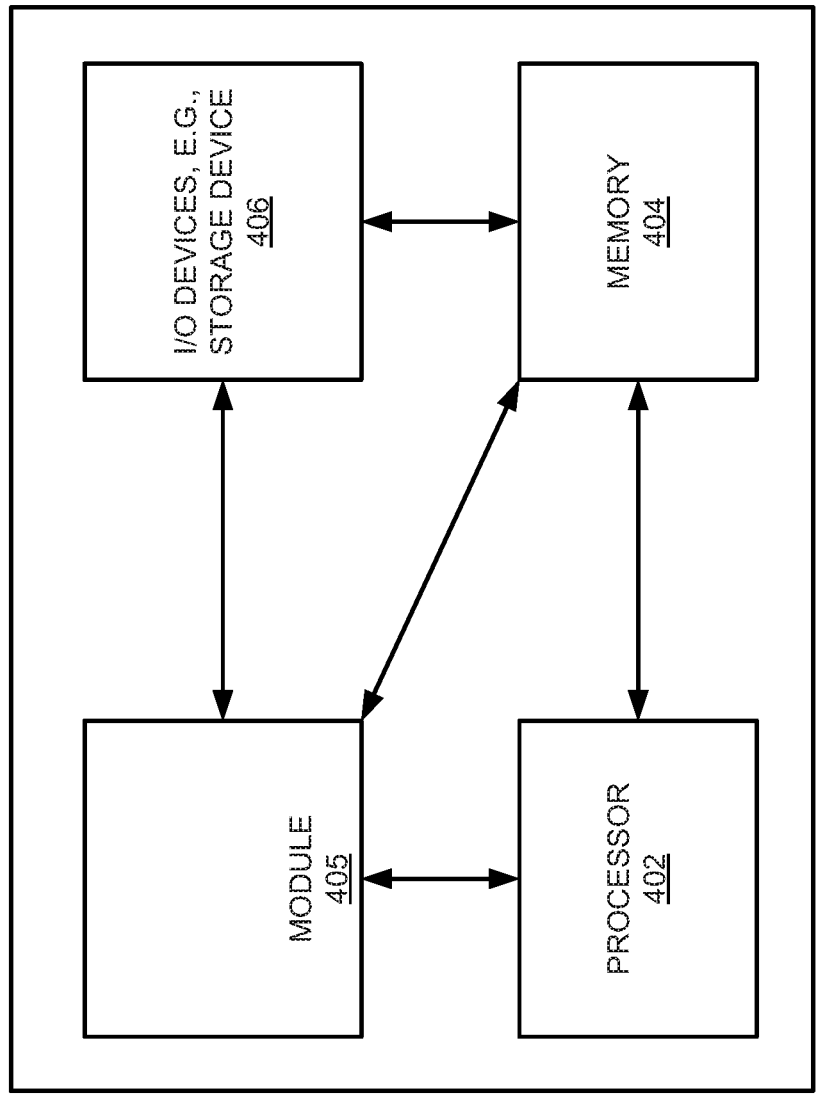
FIG. 4 depicts a high-level block diagram of a computing device specifically programmed to perform the functions described herein.

In one embodiment, the AS 104 may comprise a general purpose computer as illustrated in FIG. 4 and discussed below. In one embodiment, the AS 104 may perform the methods discussed below related to learning and facilitating interaction routines involving at least one human participant. For instance, the AS 104 may monitor user interactions, detect routines or patterns in those interactions, and use those routines or patterns to facilitate future interactions.

In one embodiment, the DB 106 may store data relating to detected routines or patterns in a user's interactions. For example, the DB 106 may store user profiles, which users or the AS 104 can update dynamically at any time. User profiles may include contact information (e.g., mobile phone number, email address, etc.) for the user and/or for contacts (e.g., other people and/or automated systems) with whom the user interacts or has interacted. User profiles may also include series of steps and/or desired responses for particular interaction routines. User profiles may be stored in encrypted form to protect user privacy.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 114 and core network 102 relating to communications with web servers, AS 104, and/or other servers via the Internet and/or other networks, and so forth.

In one embodiment, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smart phone, an email device, a computing tablet, a messaging device, a wearable "smart" device (e.g., a smart watch or fitness tracker), a portable media device (e.g., an MP3 player), a gaming console, a portable gaming device, and the like. In one example, the user endpoint devices 108, 110, 112, and 114 are capable of receiving audible (e.g., spoken) and/or manual (e.g., button press, text) inputs from a user and of providing audible (e.g., spoken, tone) and/or visible (e.g., text) outputs to the user. One or more of the user endpoint devices may comprise an automated interactive system, such as an IVR system. In one example, any one or more of the user endpoint devices 108, 110, 112, and 114 may have both cellular and non-cellular access capabilities and may further have wired communication and networking capabilities. It should be noted that although only four user endpoint devices are illustrated in FIG. 1, any number of user endpoint devices may be deployed.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, any one or more of the user endpoint devices 108, 110, 112, and 114 may host an operating system for presenting a user interface that may be used to send data to another user endpoint device 108, 110, 112, or 114 and for reviewing data sent by the other user endpoint device.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
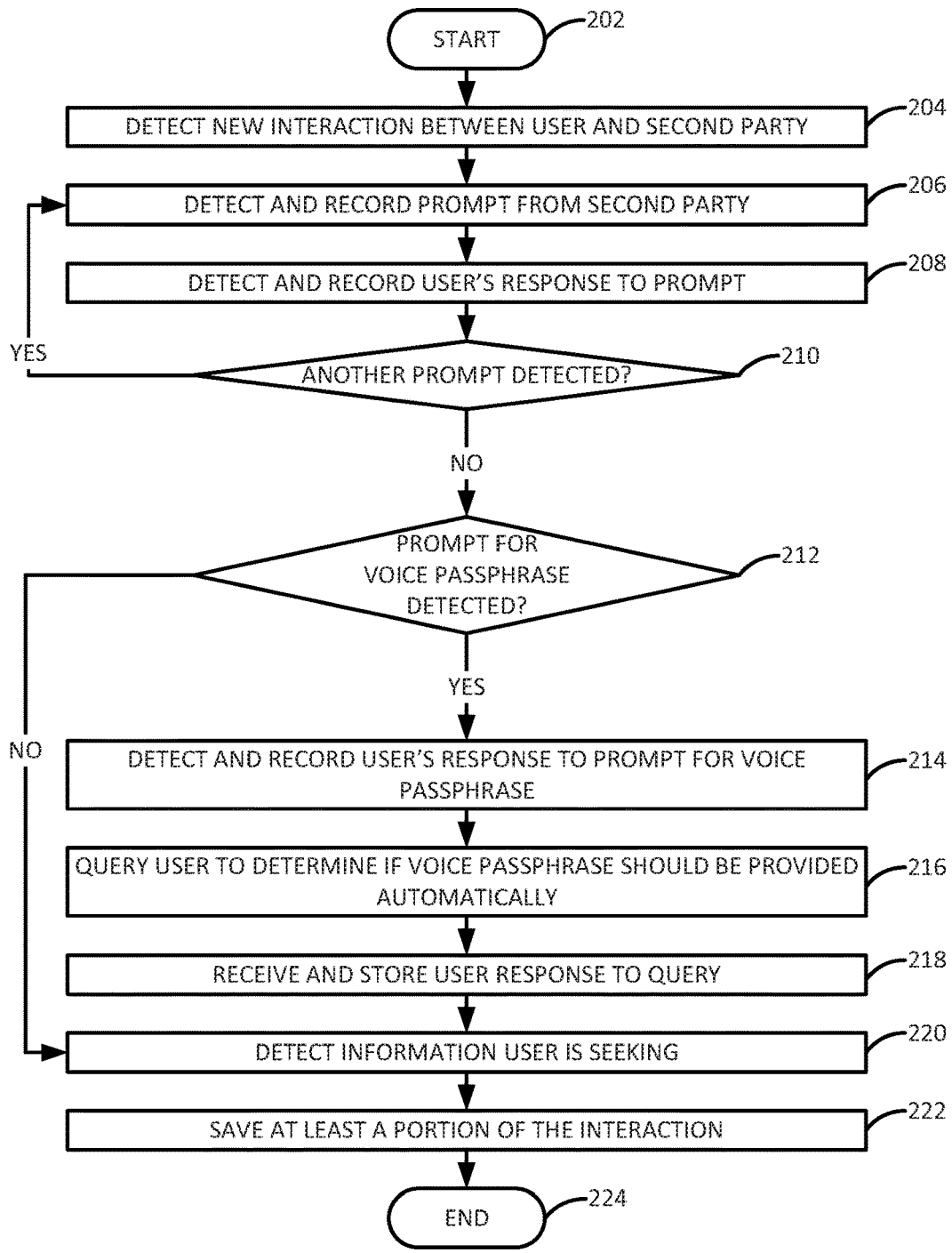
FIG. 2 illustrates a flowchart of an example method for learning an interaction routine involving at least one human participant.

FIG. 2 illustrates a flowchart of an example method 200 for learning an interaction routine involving at least one human participant. In one example, the method 200 may be performed by an application server, e.g., AS 104 of FIG. 1. In another example, the method 200 may be performed by a user endpoint device, e.g., one of the UEs 108, 10, 112, or 114 of FIG. 1. However, any references in the discussion of the method 200 to elements of FIG. 1 are not intended to limit the means by which the method 200 may be performed.

The method 200 begins in step 202. In step 204, a new interaction is detected. The new interaction may be initiated by a user (i.e., a human user), and may involve the user opening a communication connection (e.g., a phone call, a web-based chat window, an email, or the like) to a second party using a user endpoint device, such as a smart phone. The second party may be another human, an automated system (e.g., an IVR system), or a combination of the two. The information used to contact the second party (e.g., telephone number) may be recorded or stored upon detection of the new interaction. The new interaction may be detected automatically (e.g., without explicit user prompting), or the user may explicitly indicate that the new interaction is about to take place and may request that the new interaction be monitored.

In step 206, a prompt from the second party is detected and recorded. For instance, the prompt may request certain information from the user. The prompt may be an audible prompt or a visible prompt. As an example, the prompt may present a menu of options, and may ask the user to select one of the options by either speaking the selected option aloud or by pressing a button corresponding to the selected option (e.g., "Press 1 for Billing, or say 'Billing'"). Alternatively, the prompt may be an open-ended prompt (e.g., the number or format of possible responses is not fixed), to which the user may respond by speaking a verbal response or by pressing a series of buttons (e.g., "State the reason for your call"). Natural language understanding may be used to identify an intent of the prompt.

In step 208, the user's response to the prompt is detected and recorded. The response may be an audible response or a visible response. As an example, the response may be a spoken selection of an option chosen from a menu or a button press corresponding to an option chosen from a menu. Alternatively, the response may be an open-ended response (e.g., the number or format of possible responses is not fixed) in which the user speaks a verbal response or presses a series of buttons. Natural language understanding may be used to identify an intent of the response and a relationship between the response and the prompt to which it responds.

In step 210, it is determined whether another prompt from the second party has been detected. For instance, in some cases, providing a response to a first prompt may cause a new prompt to be presented, as in the case with a menu that drills down. As an example, selecting a menu option for "Billing," may cause a new menu to be presented in which more specific options such as "Pay new bill," "Dispute a bill," "Change billing address," and/or other options are presented. Natural language understanding may be used to determine whether a communication from the second party is a new prompt requiring a response, an item of requested information (e.g., confirmation that a bill has been paid), or something else.

If it is determined in step 210 that another prompt from the second party has been detected, then the method 200 returns to step 206 and proceeds as described above to record the new prompt and the user's response.

Alternatively, if it is determined in step 210 that another prompt from the second party has not been detected, then the method 200 proceeds to step 212. In step 212, it is determined whether a prompt for a voice passphrase has been detected. A voice passphrase is a fixed word or phrase that the user speaks in order to authorize an action. For instance, the voice passphrase may comprise a spoken password or personal identification number, or the voice passphrase may comprise a voice identification prompt. In the latter case, the second party requesting the voice passphrase may store a recording of the user speaking the passphrase, and may compare a new utterance of the spoken passphrase (e.g., made in response to the prompt) to the recording. If the audible similarity between the recording and the new utterance does not meet a certain threshold, the action may be cancelled. Not all interaction routines will require a voice passphrase to be provided; thus, this is why the method 200 determines in step 212 whether a voice passphrase has been requested. Natural language understanding may be used to determine that a voice passphrase has been requested.

If it is determined in step 212 that a prompt for a voice passphrase has not been detected, then the method 200 proceeds directly to step 220, described below (i.e., steps 214,218 are skipped). Alternatively, if it is determined in step 212 that a prompt for a voice passphrase has been detected, then the method 200 proceeds to step 214. In step 214, the user's response to the prompt for the voice passphrase is detected and recorded.

In step 216, the user is queried to determine whether the voice passphrase should be provided automatically in future interactions. For instance, the user response recorded in step 214 could be played back in response to future prompts for the voice passphrase. However, some users may prefer to provide their voice passphrases personally each time the voice passphrases are requested, in order to avoid the possibility of inadvertently authorizing an unwanted action.

In step 218, the user's response to the query (e.g., "provide voice passphrase automatically" or "do not provide voice passphrase automatically") is received and stored.

In step 220, the information that the user is seeking (e.g., confirmation that a bill has been paid, an amount of a balance, a discussion with a human representative, or the like) is detected. Natural language understanding may be used to determine that a communication from the second party is responsive to the reason for the user's call.

In step 222, at least a portion of the interaction (i.e., the prompts, corresponding responses, voice passphrases, user responses or queries, and/or requested information) are saved (e.g., in a user profile or other data structure storing user preferences), so that they may be used to facilitate future interactions, potentially with the same second party or with another party. Thus, the saved information may serve as a template for conducting a similar interaction in the future.

The method 200 then ends in step 224.

Thus, the method 200 may be used to learn an interaction routine that may be repeated in the future. That is, by observing at least a first instance of the interaction routine, examples of the present disclosure may be able to automatically facilitate and conduct a second instance of the interaction routine with minimal intervention from the user. As such, the learned interaction routine may be used as a template for facilitating and conducting a similar future interaction, so that the user does not need to remember menus and is spared the frustration of waiting in a potentially long queue. In further examples of the method 200, the user may be queried for additional information where the information recorded during the monitored interaction is insufficient and/or ambiguous.

Figure 3:
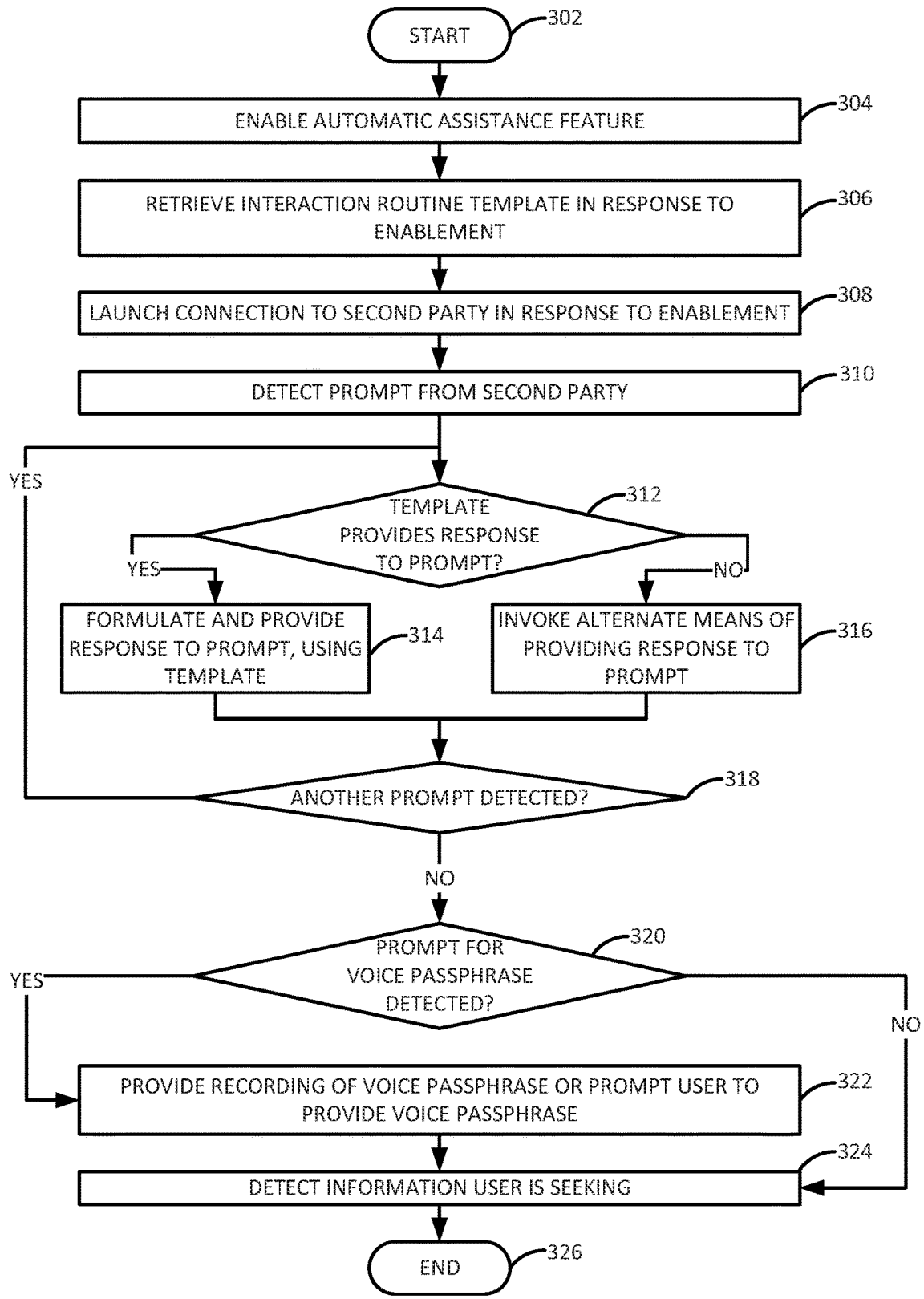
FIG. 3 illustrates a flowchart of an example method for automatically conducting an interaction involving at least one human participant, using a learned interaction routine.

FIG. 3 illustrates a flowchart of an example method 300 for automatically conducting an interaction involving at least one human participant, using a learned interaction routine. In one example, the method 300 may be performed by an application server, e.g., AS 104 of FIG. 1. In another example, the method 300 may be performed by a user endpoint device, e.g., one of the UEs 108, 10, 112, or 114 of FIG. 1. However, any references in the discussion of the method 300 to elements of FIG. 1 are not intended to limit the means by which the method 300 may be performed.

The method 300 begins in step 302. In step 304, an automatic assistance feature is enabled on a user endpoint device. The automatic assistance feature may be a feature that facilitates and conducts a known interaction routine with an interactive system. In one example, the automatic assistance feature is enabled automatically, e.g., upon detection that contact information for a known interactive system (e.g., a phone number, email address, or other contact information for an automated system (e.g., an IVR system), another human, or a combination of the two). For instance, the entry of a phone number that is known to be a customer service number for a bank may be detected. Alternatively, an explicit command from the user may be detected, where the explicit command requests enablement of the automatic assistance feature (e.g., a command to call the customer service number to check on a balance).

In step 306, an interaction routine template is retrieved, e.g., from a remote database or from local memory, in response to the enablement of the automatic assistance feature. For instance, the type of interaction desired by the user may be determined based on the enablement of the automatic assistance feature, and a template corresponding to the interaction routine for the interaction may be retrieved.

In step 308, a connection (i.e., a connection that enables two-way communication, such as a phone call, a web-based chat window, an email, or the like) to second party is launched, in response to the enablement of the automatic assistance feature. For instance, a phone call may be placed to the second party, an email may be sent to the second party, or the like.

In step 310, a prompt from the second party is detected. For instance, the prompt may request certain information from the user. The prompt may be an audible prompt or a visible prompt. As an example, the prompt may present a menu of options, and may ask the user to select one of the options by either speaking the selected option aloud or by pressing a button corresponding to the selected option (e.g., "Press 1 for Billing, or say 'Billing'"). Alternatively, the prompt may be an open-ended prompt (e.g., the number or format of possible responses is not fixed), to which the user may respond by speaking a verbal response or by pressing a series of buttons (e.g., "State the reason for your call"). Natural language understanding may be used to identify an intent of the prompt.

In step 312, it is determined whether the interaction routine template provides a response to the prompt. For instance, if the prompt detected in step 310 included the statement "Press 1 for Billing," the interaction routine template may indicate that a response indicating the pressing of the "1" button on the user's phone or computing device should be provided. However, in some cases, a discrepancy may be encountered for which the interaction routine template does not specifically provide a response. For instance, the template might not be updated to account for a recent change in the interaction routine (e.g., removal of or change to a particular prompt).

If it is determined in step 312 that the interaction routine template provides a response to the prompt, then a response to the prompt is formulated and provided in step 314, using the interaction routine template. The response may be an audible response (e.g., synthesized or recorded speech or a touch tone) or a visible response (e.g., a web-based chat message).

However, if it is determined in step 312 that the interaction routine template does not provide a response to the prompt, then an alternate means of formulating a response to the prompt is invoked in step 316. The alternate means could be one or more of a plurality of means. For instance, in one example, the user may be alerted and asked to intervene personally in the interaction. In this case, the method 200 may be invoked to observe the user and to learn the change to the interaction routine, allowing the interaction routine template to be updated. In another example, a pre-defined default response may be selected (e.g., request assistance from a human representative, hang up, etc.). In another example, an adaptive technique may be employed to formulate a response on-the-fly. The adaptive technique may be a rules-based technique that uses natural language understanding. For instance, if a menu option has simply changed from "Press 1 to pay bill" to "Press 5 to pay bill," then the response can simply indicate the pressing of a button for 5 rather than 1.

Once a response has been formulated in accordance with either step 314 or step 316, the method 300 proceeds to step 318. In step 318, it is determined whether another prompt from the second party has been detected. As discussed above, in some cases, providing a response to a first prompt may cause a new prompt to be presented, as in the case with a menu that drills down. Natural language understanding may be used to determine whether a communication from the second party is a new prompt requiring a response, an item of requested information (e.g., confirmation that a bill has been paid), or something else.

If it is determined in step 318 that another prompt from the second party has been detected, then the method 300 returns to step 312 and proceeds as described above to formulate and provide a response to the new prompt.

Alternatively, if it is determined in step 318 that another prompt from the second party has not been detected, then the method 300 proceeds to step 320. In step 320, it is determined whether a prompt for a voice passphrase has been detected. Natural language understanding may be used to determine that a voice passphrase has been requested.

If it is determined in step 320 that a prompt for a voice passphrase has been detected, then the method 300 proceeds to step 322. In step 322, either a recording of the user speaking the voice passphrase is provided, or the user is prompted to personally provide the voice passphrase, depending on the user preference (which may be indicated in the interaction routine template).

Once the voice passphrase has been provided in step 322, or if it is determined that a prompt for a voice passphrase has not been detected, the method 300 proceeds to step 324.

In step 324, the information that the user is seeking (e.g., confirmation that a bill has been paid, an amount of a balance, a discussion with a human representative, or the like) is detected. Natural language understanding may be used to determine that a communication from the second party is responsive to the reason for the user's call.

The method ends in step 326.

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the methods 200 and 300 may be implemented as the system 400. For instance, a user endpoint device or an application server (such as might be used to perform the methods 200 or 300) could be implemented as illustrated in FIG. 4.

As depicted in FIG. 4, the system 400 comprises a hardware processor element 402, a memory 404, a module 405 for learning and facilitating interaction routines, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for learning and facilitating interaction routines may include circuitry and/or logic for performing special purpose functions relating to the monitoring, learning, and conducting of interactions. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. However, in other examples, the computing environment is not virtualized.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for learning and facilitating interaction routines (e.g., a software program comprising computer-executable instructions) can be loaded into memory 404 and executed by hardware processor element 402 to implement the steps, functions or operations as discussed above in connection with the example methods 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for learning and facilitating interaction routines (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
   learning, by a processing system including at least one processor, an interaction routine conducted between a human user and an automated system, wherein the interaction routine comprises a series of prompts of the automated system and a series of responses of the human user to the series of prompts, wherein the series of prompts of the automated system and the series of responses of the human user are collectively designed to identify and deliver desired information;

storing, by the processing system, a template of the interaction routine based on the learning, wherein the template includes at least a portion of the series of prompts of the automated system and the series of responses of the human user;

detecting, by the processing system, in the course of a new instance of the interaction routine, at least one prompt from the automated system that requests a response from the human user; and using, by the processing system, the template to provide a response on behalf of the human user to the at least one prompt from the automated system so that involvement of the human user in the new instance of the interaction routine is minimized.

2. The method of claim 1, wherein the storing the template comprises:
recording a first prompt of the series of prompts of the automated system; and
recording a first response of the series of responses of the human user, wherein the first response is responsive to the first prompt.

3. The method of claim 2, wherein the using the template comprises:
detecting that the at least one prompt from the automated system matches the first prompt; and
responding to the at least one prompt from the automated system with the first response.

4. The method of claim 3, wherein the first prompt is a prompt to select an option from a menu.

5. The method of claim 4, wherein the first response indicates a pushing of a button corresponding to an option from the menu.

6. The method of claim 4, wherein the first response comprises a recording of the human user speaking an option from the menu.

7. The method of claim 3, wherein the first prompt is a request to state a reason for an initiation of the interaction routine.

8. The method of claim 7, wherein the first response comprises a recording of the human user speaking the reason.

9. The method of claim 3, wherein the first prompt is a request to speak a voice passphrase.

10. The method of claim 9, wherein the first response comprises a recording of the human user speaking the voice passphrase.

11. The method of claim 9, wherein the first response comprises prompting the human user to speak the voice passphrase.

12. The method of claim 2, wherein the using the template comprises:
detecting that the at least one prompt from the automated system does not match any prompts in the template; and
invoking an alternate means of providing the response to the at least one prompt from the automated system.

13. The method of claim 12, wherein the invoking the alternate means comprises:
requesting intervention from the human user.

14. The method of claim 12, wherein the invoking the alternate means comprises:
providing a pre-defined default response in response to the at least one prompt from the automated system.

15. The method of claim 12, wherein the invoking the alternate means comprises:
adapting the first response so that the first response is responsive to the at least one prompt from the automated system.

16. A device, comprising:
a processing system including at least one processor; and
a computer-readable medium storing instructions which, when executed by the processing system, cause the processing system to perform operations, the operations comprising:
learning an interaction routine conducted between a human user and an automated system, wherein the interaction routine comprises a series of prompts of the automated system and a series of responses of the human user to the series of prompts, wherein the series of prompts of the automated system and the series of responses of the human user are collectively designed to identify and deliver desired information;
storing a template of the interaction routine based on the learning, wherein the template includes at least a portion of the series of prompts of the automated system and the series of responses of the human user;
detecting, in the course of a new instance of the interaction routine, at least one prompt from the automated system that requests a response from the human user; and
using the template to provide a response on behalf of the human user to the at least one prompt from the automated system so that involvement of the human user in the new instance of the interaction routine is minimized.

17. A non-transitory computer-readable medium storing instructions which, when executed by a processing system including at least one processor, cause the processing system to perform operations, the operations comprising:
learning an interaction routine conducted between a human user and an automated system, wherein the interaction routine comprises a series of prompts of the automated system and a series of responses of the human user to the series of prompts, wherein the series of prompts of the automated system and the series of responses of the human user are collectively designed to identify and deliver desired information;
storing a template of the interaction routine based on the learning, wherein the template includes at least a portion of the series of prompts of the automated system and the series of responses of the human user;
detecting, in the course of a new instance of the interaction routine, at least one prompt from the automated system that requests a response from the human user; and
using the template to provide a response on behalf of the human user to the at least one prompt from the automated system so that involvement of the human user in the new instance of the interaction routine is minimized.

18. The non-transitory computer-readable medium of claim 17, wherein the storing the template comprises:
recording a first prompt of the series of prompts of the automated system; and
recording a first response of the series of responses of the human user, wherein the first response is responsive to the first prompt.

19. The non-transitory computer-readable medium of claim 18, wherein the using the template comprises:
   detecting that the at least one prompt from the automated system matches the first prompt; and
   responding to the at least one prompt from the automated system with the first response.

20. The non-transitory computer-readable medium of claim 19, wherein the first prompt is a prompt to select an option from a menu.

* * * * *